United States Patent [19]
Dahlquist

[11] Patent Number: 5,105,954
[45] Date of Patent: Apr. 21, 1992

[54] FOLDABLE STORAGE RACK

[76] Inventor: Donald J. Dahlquist, 6015 Trailside Dr., Springfield, Va. 22150

[21] Appl. No.: 695,091

[22] Filed: May 3, 1991

[51] Int. Cl.⁵ .............................................. A47F 5/00
[52] U.S. Cl. ...................................... 211/195; 211/90
[58] Field of Search ............... 248/224, 296; 211/195, 211/90

[56] References Cited

U.S. PATENT DOCUMENTS 3,948,191  4/1976  Hatherley .......................... 211/90

Primary Examiner—Robert W. Gibson, Jr.
Attorney, Agent, or Firm—Laubscher, Presta & Laubscher

[57] ABSTRACT

A foldable storage rack for recreational vehicles is characterized by a laterally extending bottom panel, upwardly extending end panels at each end of the bottom panel, and laterally outwardly extending top support panels at the upper ends of the end panels. The panels are pivotally connected at their end portions with hinges so that the panels form a substantially rigid support structure when the adjoining panels are arranged perpendicular to each other. When it is desired to store the rack, the end panels are pivoted inwardly into overlapping relation with the bottom panel and the top panels are pivoted downwardly into overlapping relation with the end panels so that the rack can be stored in a substantially flat configuration.

4 Claims, 1 Drawing Sheet

FOLDABLE STORAGE RACK

In a recreational vehicle (RV), space is at a premium. Manufacturers are continually trying to improve upon RV designs in order to maximize the usage of the interior space of the vehicle by reducing dead space, that is, space which can not be utilized.

A very popular type of recreational vehicle is the class C type in which a cab or compartment is provided over the top of the driver's and passenger's seats. Normally, this compartment contains a bed. When the RV is parked, at a campground or the like, the space beneath the bed, where the driver and passenger are seated, comprises dead space, particularly the area between the top of the driver's seat and the bottom of the bed.

The present invention relates to a foldable storage rack which can be installed in the dead space beneath the bed to provide support for a television, a video cassette recorder, or other appliance.

Currently, such appliances are placed on the edge of a table within the RV. They thus take up valuable space and also hinder movement about the vehicle. Furthermore, when a television is arranged on a table, there is no adequate viewing area. With the storage rack of the invention, the appliances can be located out of the way, thereby increasing the effective usable space in the RV. When not in use, the rack is folded to a compact configuration for storage.

BRIEF DESCRIPTION OF THE PRIOR ART

Folding tables and shelves are well known in the prior art. For example, shelving exists which is pivotally connected with a wall. A leg is hinged to the bottom of the shelf and swung out to support the shelf and swing out to support the shelf when the shelf is in a horizontal position. When the shelf is not in use, it is pivoted to a position parallel to the wall.

Collapsible shelving is known in the patented prior art as evidenced by the U.S. Pat. No. 3,948,191 to Hatherly which discloses a plurality of boards hingedly connected end to end in a stair-step configuration to define a collapsible shelf.

While the prior devices are satisfactory for the purposes for which they were designed, none are suitable for use in an RV, and particularly a class C RV, for mounting beneath a cabin bed within the dead space of the driving compartment.

SUMMARY OF THE INVENTION

Accordingly, it is a primary object of the present invention to provide a foldable storage rack for use in a recreational vehicle. The rack includes a rectangular horizontal base panel and two end panels pivotally connected with opposite edges thereof. The end panels pivot between a first position where the panels are in a parallel contiguous relation with the base panel and a second position where the end panels extend upwardly no more than 90° from the base panel. Two top panels are pivotally connected at one edge with the top edges of the end panels, respectively. The top panels also pivot between a first position where the panels are in a parallel contiguous relation and a second position where the top panels extend outwardly no more than 90° from the end panels, respectively. When the end and top panels are in their second positions, a rigid storage rack is defined. When the end and top panels are pivoted to their first positions, the rack is folded to a compact configuration for storage.

The base, end, and top panels are preferably connected together with hinges which extend along the connected edges of the panels. Because the panels can not be pivoted beyond 90° with respect to one another, the ends of the panels abut each other to increase the structural stability of the rack when in its erected position.

BRIEF DESCRIPTION OF THE FIGURES

Other objects and advantages of the invention will become apparent from a study of the following specification when viewed in the light of the accompanying drawing, in which.

DETAILED DESCRIPTION

Figure 1:
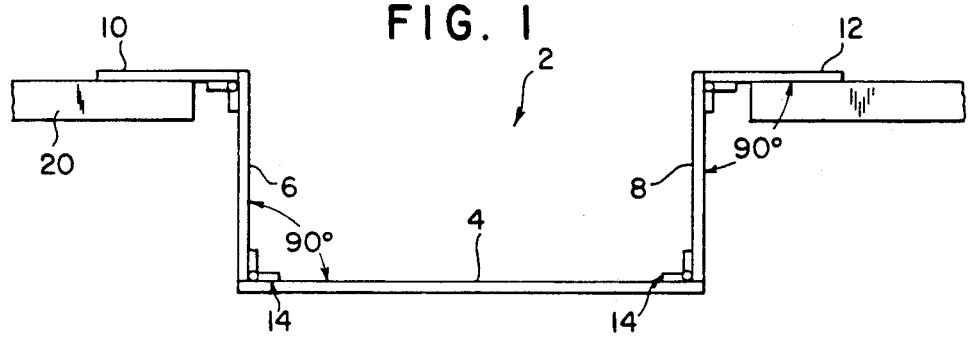
FIGS. 1 and 2 are front and top plan views, respectively, of the foldable storage rack of the invention in its erect position.
Figure 2:
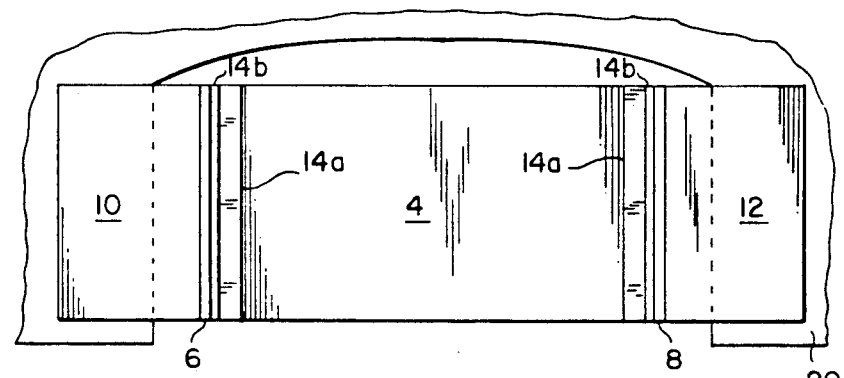

Referring first to FIGS. 1 and 2, the foldable storage rack 2 of the invention will be described. The rack includes a generally rectangular base panel 4, a pair of rectangular end panels 6, 8, and a pair of rectangular top panels 10, 12.

The panels all have a rectangular configuration to facilitate their joinder as will be developed below. The height H of each end panel 6, 8 is preferably slightly less than one-half the width W of the base panel 4, and the width X of each top panel 10, 12 is preferably less than the height H of the end panels. All of the panels are formed of an inexpensive rigid material, such as plywood, particle board, or synthetic plastic material.

Because of its rectangular configuration, the base panel 4 has opposite edges having longer and shorter dimensions, respectively. At the edges of the shorter dimension are arranged the pair of end panels. The end panels are pivotally connected at their bottom edges with the edges of the base panel by way of hinges 14. As shown in FIG. 2, the hinges preferably extend continuously along the edges being connected, with the members 14a, 14b of the hinge being connected with the respective panel edges using screws or other fasteners known in the art.

Similarly, the top panels 10, 12 are pivotally connected at their side edges with the top edges of the end panels 6, 8, respectively, by hinges 14 which also extend continuously along the edges being joined.

Figure 5:
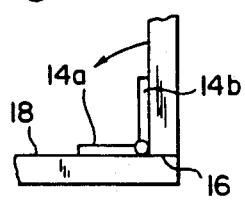
FIGS. 5 and 6 are detailed front plan view of two different hinge connections, respectively, between adjoining panels.
Figure 6:
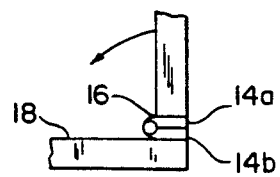

An important aspect of the invention is the arrangement of the panels at the area of joinder. More particularly, as shown in FIGS. 5 and 6, the end face 16 of the pivoting panel must overlap a side surface 18 of the fixed panel. That is, for joinder of the end panels 6, 8 to the base panel 4, the base panel is fixed and the end panels pivot. Thus the bottom face of the end panels overlaps the top surface of the base panel. For joinder of the top panels 10, 12 to the respective end panels, the end panels are fixed and the top panels pivot. Thus, the end face of the top panels overlaps the outer side surface of the respective base panels.

Figure 4:
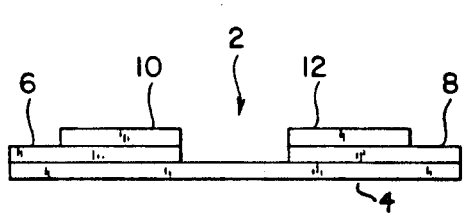
FIG. 4 is a front plan view of the rack of the invention in its folded position.

Such an arrangement insures that the end panels can pivot from a first position shown in FIG. 4 where the end panels are in parallel contiguous relation with the base panel to a second position shown in FIG. 1 where the end panels are arranged at 90° with respect to the base panel. Pivotal movement beyond 90° is prevented by the abutment of the bottom face of the end panel against the surface of the base panel. Similarly, the top panels pivot from a first position shown in FIG. 4 where the top panels are in parallel contiguous relation with the end panels to a second position shown in FIG. 1 where the end panels are arranged at 90° with respect to the associated end panel. Accordingly, the rack can be manipulated between a folded compact configuration (FIG. 4) when the top and end panels are in their first positions and an erect configuration (FIG. 1) when the top and end panels are in their second positions.

Figure 3:
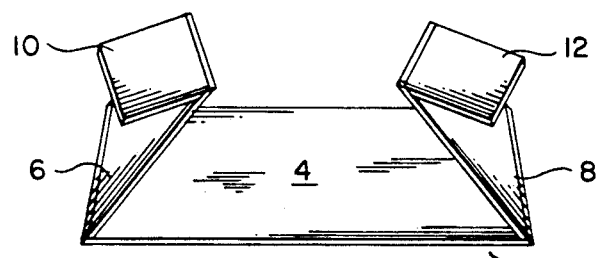
FIG. 3 is a perspective view of the rack of the invention in a partially folded condition.

FIG. 3 illustrates an intermediate position of the rack between the erect and folded configurations.

FIGS. 5 and 6 illustrate two different arrangements for the hinges 14. In FIG. 5, the hinge members 14a, 14b are connected with the side surface of the panels being joined whereas in FIG. 6, one hinge member 14a is connected with a side surface 18 of the fixed panel and the other hinge member 14b is connected with an end surface 16 of the pivotal panel.

OPERATION

When in the folded configuration of FIG. 4, the rack 2 is compact for storage. In use, the top and end panels are pivoted to their second positions, whereby the rack attains its erect configuration. The base and top panels are arranged horizontally and the end panels are arranged vertically. This configuration is maintained owing to the unique joinder of the panels.

In an RV of the class C type, the bed platform 20 above the driver's compartment contains a removable portion (not shown) to define an opening 22 which facilitates passage of the driver from the driving cabin or compartment of the vehicle to the rear living area. The storage rack of the invention is adapted for placement within the opening. The top panels 10, 12 are placed on the bed platform 20 as shown in FIG. 2, and the end and base panels depend therefrom into the dead space of the cabin as shown in FIG. 1.

The rack can be used as a shelf or the like to support books, plants, a television, or anything else desired by the occupant. The rack may include an electrical receptacle to which electrical appliances can be connected. An extension cord from the receptacle to the electrical source of the RV can be connected with the rack. Any number of other accessories can be included on the rack.

The rack can also be provided with different dimensions for accomodation in different sized vehicles. While the preferred configuration of the rack has been illustrated and described, it will be apparent to those of ordinary skill in the art that various changes and modifications may be made without deviating from the inventive concepts set forth above.

What is claimed is:

1. A foldable storage rack for use in recreational vehicles, comprising
    (a) a generally rectangular horizontal base panel;
    (b) a pair of end panels arranged at opposite edges of said base panel;
    (c) first hinge means for connecting a bottom edge of each end panel with a respective edge of said base panel, said first hinge means extending continuously along the connected edges of said end and base panels and affording pivotal movement of said end panels between a first position where said panels are in parallel contiguous relation with said base panel and a second position where said end panels extend upwardly no more than 90° from said base panel;
    (d) a pair of top panels arranged at a top edge of said pair of end panels, respectively; and
    (e) second hinge means for connecting an edge of each top panel with said end panel top edges, respectively, said second hinge means extending continuously along the connected edges of said end and top panels between a first position where said panels are in parallel contiguous relation with said end panels, respectively, and a second position where said top panels extend outwardly no more than 90° from said end panels, respectively, said base panel being suspended between and beneath said top panels in spaced parallel relation thereto by said end panels when said end and top panels being supported by a bed frame of the recreational vehicle with said base panel depending therefrom to provide a rigid storage rack, whereby when said end and top panels are pivoted to said first positions, the rack is folded to a compact configuration for storage.

2. A foldable storage rack as defined in claim 1, wherein said panels are formed of rigid material.

3. A foldable storage rack as defined in claim 2, wherein the height of each end panel is less than one-half the width of said base panel.

4. A foldable storage rack as defined in claim 3, wherein the width of each top panel is less than the height of each end panel.

* * * * *